United States Patent
Hu et al.

(10) Patent No.: US 9,756,624 B2
(45) Date of Patent: Sep. 5, 2017

(54) METHOD AND DEVICE FOR RESOURCE CONFIGURATION

(71) Applicant: Huawei Technologies Co., Ltd., Shenzhen, Guangdong (CN)

(72) Inventors: Zhenxing Hu, Shenzhen (CN); Yongqiang Gao, Shenzhen (CN); Wen Zhang, Shenzhen (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 14/467,844

(22) Filed: Aug. 25, 2014

(65) Prior Publication Data
US 2014/0362813 A1    Dec. 11, 2014

Related U.S. Application Data (63) Continuation of application No. PCT/CN2012/082399, filed on Sep. 28, 2012.

(51) Int. Cl.
*H04W 72/04* (2009.01)
*H04W 74/08* (2009.01)

(52) U.S. Cl.
CPC ..... *H04W 72/042* (2013.01); *H04W 74/0833* (2013.01); *H04W 72/0413* (2013.01)

(58) Field of Classification Search
CPC .......... H04W 72/0413; H04W 72/042; H04W 74/006; H04W 74/08; H04W 74/0833
See application file for complete search history.

(56) References Cited

U.S. PATENT DOCUMENTS

| | | | |
|---|---|---|---|
| 2004/0058678 A1 | 3/2004 | deTorbal | |
| 2009/0011718 A1* | 1/2009 | Chun | H04W 56/00 455/70 |

(Continued)

FOREIGN PATENT DOCUMENTS

| | | |
|---|---|---|
| CN | 101677458 A | 3/2010 |
| CN | 102378387 A | 3/2012 |

(Continued)

OTHER PUBLICATIONS

"3$^{rd}$ Generation Partnership Project; Technical Specification Group Radio Access Network; Medium Access Control (MAC) protocol specification (Release 11)," 3GPP TS 25.321, V11.2.0, pp. 1-198, 3$^{rd}$ Generation Partnership Project, Valbonne, France (Sep. 2012).

*Primary Examiner* — Scott M Sciacca
(74) *Attorney, Agent, or Firm* — Leydig, Voit & Mayer, Ltd.

(57) ABSTRACT

The present invention discloses a method and a device for resource configuration, the method includes: at first a base station broadcasts public resource configuration to a user equipment on a broadcast channel, and then the base station obtains an available public resource after receiving public resource requesting information sent by a target user equipment in a desynchronization state, the target user equipment is a user equipment of the user equipments which is in a desynchronization state; finally the base station sends an index number of the available public resource to the target user equipment, so that the target user equipment performs data transmission through the available public resource corresponding to the index number of the available public resource. The present invention can be applied to the field of communication system.

16 Claims, 4 Drawing Sheets

(56) References Cited

U.S. PATENT DOCUMENTS

| | | |
|---|---|---|
| 2009/0181710 A1 | 7/2009 | Pani et al. |
| 2009/0258666 A1* | 10/2009 | Pelletier ............ H04W 74/0833 455/522 |
| 2011/0075629 A1* | 3/2011 | Seo ..................... H04W 74/002 370/330 |
| 2011/0170503 A1* | 7/2011 | Chun .................. H04W 74/006 370/329 |
| 2011/0274040 A1* | 11/2011 | Pani ..................... H04W 4/005 370/328 |
| 2014/0153517 A1* | 6/2014 | Chen ................. H04W 74/0833 370/329 |

FOREIGN PATENT DOCUMENTS

| | | |
|---|---|---|
| EP | 1401229 A1 | 3/2004 |
| WO | WO 2009055662 A2 | 4/2009 |
| WO | WO 2010124228 A2 | 10/2010 |
| WO | WO 2011050849 A1 | 5/2011 |
| WO | WO 2011132721 A1 | 10/2011 |

* cited by examiner

METHOD AND DEVICE FOR RESOURCE CONFIGURATION

CROSS-REFERENCE TO RELATED APPLICATIONS

This application is a continuation of International Patent Application No. PCT/CN2012/082399, filed Sep. 28, 2012, which is hereby incorporated by reference in its entirety.

TECHNICAL FIELD

The present invention relates to the field of communication systems, and in particular, to methods and devices for resource configuration.

BACKGROUND

Internet of things is also called M2M, which can achieve intelligent interconnection among people, equipments and systems. The Internet of things is aimed at connecting all items with the Internet via information sensing equipments, so as to achieve intelligentized identification and management. Combined with the Internet, the Internet of things can achieve remote sense and control of all items, thereby generating a more intelligent production and life system. It is much huger than the current Internet, and is widely used in multiple fields of smart grid, smart intelligent transportation system, and environmental protection, etc.

Currently, the scenario of intermittently sending small packets exists in user equipments such as smart phones etc, and some M2M applications such as smart meter reading, each transmission of a relatively small amount of data needs a lot of signaling interactions, especially RB (radio bearer) configuration and release procedures, thereby taking up relatively more system resources, and resulting in inefficient data transmission.

The way of the user equipments being permanent online in a desynchronization state is now commonly adopted to solve the above problem. In this way, a UE (User Equipment, user equipment) first save physical layer resource configuration information context which is configured by a base station; when data arrive at the user equipment, the user equipment can send the data directly after performing a synchronization process; and then the user equipment will release the physical layer resource configuration, which includes PUCCH (Physical Uplink Control Channel, physical uplink control channel) and SRS (sounding reference signal, Sounding Reference Signal). However, when user equipment data arrive again, the base station needs to re-configure the user equipment, that is, the base station still needs to send a reconfiguration message to the user equipment to configure an available public resource for the user equipment, thereby resulting in high signaling overhead during the information interactions between the user equipment and the base station.

SUMMARY

Embodiments of the present invention provide methods and devices for resource configuration, which reduce signaling overhead during information interactions between the user equipment and the base station.

Technical solutions adopted by embodiments of the present invention are:

One aspect provides a method for resource configuration including:

broadcasting, by a base station, public resource configuration to a user equipment on a broadcast channel, where the public resource configuration includes a physical resource configuration list (PHYConfig list);

obtaining, by the base station, an available public resource after receiving public resource requesting information sent by a target user equipment which is in a desynchronization state;

sending, by the base station, an index number of the available public resource to the target user equipment, so that the target user equipment performs data transmission through the available public resource corresponding to the index number of the available public resource, where the available public resource is obtained by the target user equipment from the PHYConfig list according to the index number of the available public resource.

Before receiving, by the base station, the public resource requesting information sent by the target user equipment which is in the desynchronization state, the method further includes:

triggering, by the base station, the target user equipment to enter into the desynchronization state through medium access control (MAC) layer control information or a radio resource control protocol (RRC) message.

The obtaining, by the base station, the available public resource after receiving the public resource requesting information sent by the target user equipment includes:

if the target user equipment accesses through an ordinary preamble (preamble) and accesses successfully, obtaining, by the base station, the available public resource after receiving a MSG3 message which carries a public resource request and is sent by the target user equipment.

The public resource configuration further includes access resources (RACH resources), the obtaining, by the base station, the available public resource after receiving the public resource requesting information sent by the target user equipment which is in the desynchronization state includes:

if the target user equipment accesses through a dedicated preamble for public resource contention, obtaining, by the base station, the available public resource after receiving access information which carries the dedicated preamble for the public resource contention and is sent by the target user equipment, where the dedicated preamble for the public resource contention is selected from the RACH resources by the target user equipment;

The sending, by the base station the index number of the available public resource to the target user equipment includes:

sending, by the base station, an extended access response (RAR) to the target user equipment, where the extended RAR carries the index number of the available public resource.

The public resource configuration further includes backoff parameters (BackOff parameters); after receiving, by the base station, the access information which carries the dedicated preamble for the public resource contention and is sent by the target user equipment, and before obtaining the available public resource, the method further includes:

if there is no available public resource, indicating, by the base station, the target user equipment to perform backoff according to the backoff parameters (BackOff parameters).

After sending, by the base station, the index number of the available public resource to the target user equipment, the method further includes:

releasing, by the base station, the available public resource.

The releasing, by the base station, the available public resource includes:

when the base station determines that a buffer status report carried by the target user equipment is 0, releasing, by the base station the available public resource; or when the base station determines that a maximum resource occupancy time exceeds a maximum occupancy time indicated in the public resource configuration, releasing, by the base station, the available public resource; or indicating, by the base station, the target user equipment via a signaling to release the available public resource.

After broadcasting, by the base station, the public resource configuration to the user equipments on the broadcast channel, the method further includes:

when the base station needs to transmit downlink data to the target user equipment and the available public resource exists, sending, by the base station, the index number of the available public resources to the target user equipment and a physical downlink control channel order (PDCCH order) to the target user equipment;

if the PDCCH order carries a dedicated access resource configured for the target user equipment, then after the target user equipment accesses successfully through the dedicated access resource, scheduling, by the base station, the target user equipment to receive the downlink data through the available public resource, where the available public resource is obtained by the target user equipment from the PHYConfig list according to the index number of the available public resource; or if the PDCCH order does not carry the dedicated access resource configured for the target user equipment, then after the target user equipment accesses successfully, receiving, by the base station, an identifier C-RNTI of the target user equipment which is sent by the target user equipment;

scrambling, by the base station, a physical downlink control channel with the C-RNTI, and indicating the user equipment, via the scrambled physical downlink control channel, to receive the downlink data through the available public resource.

Another aspect provides another method for resource configuration, including:

receiving, by a user equipment, public resource configuration sent by a base station through a broadcast channel, where the public resource configuration includes a physical resource configuration list (PHYConfig list);

sending, by a target user equipment of the user equipment public resource requesting information to the base station, so that the base station obtains an available public resource, wherein the target user equipment is in a desynchronization state;

receiving, by the target user equipment, an index number of the available public resource sent by the base station;

performing, by the target user equipment, data transmission through the available public resource corresponding to the index number of the available public resource, where the available public resource is obtained by the target user equipment from the PHYConfig list according to the index number of the available public resource.

Before the sending, by the target user equipment of the user equipment, the public resource requesting information to the base station, where the target user equipment is in the desynchronization state, the method further includes:

entering, by the target user equipment, into the desynchronization state according to medium access control (MAC) layer control information or a radio resource control protocol (RRC) message.

The sending, by the target user equipment of the user equipment, the public resource requesting information to the base station, where the target user equipment is in the desynchronization state, includes:

if the target user equipment accesses through an ordinary preamble (preamble) and accesses successfully, sending, by the target user equipment to the base station, a MSG3 message carrying a public resource request.

The public resource configuration further includes access resources (RACH resources), the sending, by the target user equipment of the user equipment, the public resource requesting information to the base station, where the target user equipment is in the desynchronization state, includes:

if the target user equipment accesses through a dedicated preamble for public resource contention, sending, by the target user equipment to the base station, access information carrying the dedicated preamble for public resource contention, where the dedicated preamble for the public resource contention is selected by the target user equipment from the RACH resources;

The receiving, by the target user equipment, the index number of the available public resource sent by the base station includes:

receiving, by the target user equipment, an extended access response (RAR) sent by the base station, where the extended RAR carries the index number of the available public resource.

The public resource configuration further includes backoff parameters (BackOff parameters), after the target user equipment sends to the base station the access information carrying the dedicated preamble for the public resource contention, the method further includes:

if there is no available public resource, receiving, by the target user equipment, indication information sent by the base station, where the indication information is used to indicate the target user equipment to perform an operation of backoff; and performing, by the target user equipment, the backoff according to the backoff parameters (BackOff parameters).

After the performing, by the target user equipment, the data transmission through the available public resource corresponding to the index number of the available public resource, the method further includes:

releasing, by the target user equipment, the available public resource.

The releasing, by the target user equipment, the available public resource includes:

when the target user equipment determines that a buffer status report is 0, releasing, by the target user equipment, the available public resource; or when a maximum resource occupancy time exceeds a maximum occupancy time indicated in the public resource configuration, releasing, by the target user equipment, the available public resource; or releasing, by the target user equipment, the available public resource according to an indication of the base station.

After the receiving, by the user equipment, the public resource configuration sent by the base station through the broadcast channel, the method further includes:

when the base station needs to transmit downlink data to the target user equipment and the available public resource exists, receiving, by the target user equipment, the index number of the available public resource and a physical downlink control channel order (PDCCH order) sent by the base station;

if the PDCCH order carries a dedicated access resource configured for the target user equipment, receiving, by the target user equipment, the downlink data through the available public resource according to a schedule of the base station, where the available public resource is obtained by the target user equipment from the PHYConfig list according to the index number of the available public resource; or if the PDCCH order does not carry the dedicated access resource configured for the target user equipment, then after the target user equipment accesses successfully, sending, by the target user equipment, an identifier C-RNTI of the target user equipment to the base station;

receiving, by the target user equipment, the downlink data through the available public resource according to an indication of the base station.

Another aspect provides a device for resource configuration, including:

a broadcasting unit, configured to broadcast public resource configuration to a user equipment on a broadcast channel, where the public resource configuration includes a physical resource configuration list (PHYConfig list);

a first receiving unit, configured to, after the broadcasting unit broadcasts the public resource configuration to the user equipment on the broadcast channel, receive public resource requesting information sent by a target user equipment which is in a desynchronization state;

an obtaining unit, configured to, after the first receiving unit receives the public resource requesting information sent by the target user equipment, obtain an available public resource;

a first sending unit, configured to send an index number of the available public resource obtained by the obtaining unit to the target user equipment, so that the target user equipment performs data transmission through the available public resource corresponding to the index number of the available public resource, where the available public resource is obtained by the target user equipment, according to the index number of the available public resources, from the PHYConfig list broadcasted by the broadcasting unit.

The device further includes:

a triggering unit, configured to, before the first receiving unit receives the public resource requesting information sent by the target user equipment, trigger the target user equipment to enter into the desynchronization state through medium access control (MAC) layer control information or a radio resource control protocol (RRC) message.

The first receiving unit, is specifically configured to, if the target user equipment accesses through an ordinary preamble (preamble) and accesses successfully, receive a MSG3 message which carries a public resource request and is sent by the target user equipment.

The first receiving unit, is further specifically configured to, if the target user equipment accesses through a dedicated preamble for the public resource contention, receive access information which carries the dedicated preamble for the public resource contention and is sent by the target user equipment, where the dedicated preamble for the public resource contention is selected by the target user equipment from the RACH resources;

the first sending unit, is specifically configured to send an extended access response (RAR) to the target user equipment, where the extended RAR carries the index number of the available public resource.

The device further includes:

a first indication unit, configured to, before the obtaining unit obtains the available public resource, if there is no available public resource, indicate the target user equipment to perform backoff according to backoff parameters (BackOff parameters).

A releasing unit, configured to, after the first sending unit sends the index number of the available public resource to the target user equipment, release the available public resource.

The releasing unit, is specifically configured to, when a buffer status report carried by the target user equipment is 0, release the available public resource; or when a maximum resource occupancy time exceeds a maximum occupancy time indicated in the public resource configuration, release the available public resource; or indicate the target user equipment via a signaling to release the available public resource.

The device further includes:

a second sending unit, configured to, after the broadcasting unit broadcasts the public resource configuration to the user equipments on the broadcast channel, if downlink data needs to be transmitted to the target user equipment and the available public resource exists, send the index number of the available public resource to the target user equipment and send a physical downlink control channel order (PDCCH order) to the target user equipment;

a scheduling unit, configured to, after the second sending unit sends the index number of the available public resource to the target user equipment and the physical downlink control channel order (PDCCH order) to the target user equipment, if the PDCCH order carries a dedicated access resource configured for the target user equipment, then after the target user equipment accesses successfully through the dedicated access resource, schedule the target user equipment to receive the downlink data through the available public resource, where the available public resource is obtained from the PHYConfig list by the target user equipment according to the index number of the available public resource; or a second receiving unit, configured to, after the second sending unit sends the index number of the available public resource to the target user equipment and sends the physical downlink control channel order (PDCCH order) to the target user equipment, if the PDCCH order does not carry the dedicated access resource configured for the target user equipment, then after the target user equipment accesses successfully, receive an identifier C-RNTI of the target user equipment which is sent by the target user equipment;

a second indication unit, configured to, after scrambling a physical downlink control channel with the C-RNTI received by the second receiving unit, indicate the user equipment, via the scrambled physical downlink control channel, to receive the downlink data through the available public resource.

Another aspect provides another device for resource configuration, including:

a first receiving unit, configured to receive public resource configuration sent by a base station through a broadcast channel, where the public resource configuration includes a physical resource configuration list (PHYConfig list);

a first sending unit, configured to, after the first receiving unit receives the public resource configuration sent by the base station through the broadcast channel, send public resource requesting information to the base station, so that the base station obtains an available public resource;

a second receiving unit, configured to receive an index number of the available public resource sent by the base station;

a transmitting unit, configured to perform data transmission through the available public resource corresponding to the index number of the available public resource received by the second receiving unit, where the available public resource is obtained by the target user equipment from the PHYConfig list according to the index number of the available public resource.

The device further includes:

a desynchronization unit, configured to, before the first sending unit sends the public resource requesting information to the base station, enter into the desynchronization state according to medium access control (MAC) layer control information or a radio resource control protocol (RRC) message.

The first sending unit, is specifically configured to, if accessing through an ordinary preamble (preamble) and accessing successfully, send to the base station a MSG3 message carrying a public resource request.

The first sending unit, is further specifically configured to, if accessing through a dedicated preamble for public resource contention, send to the base station access information carrying the dedicated preamble for the public resource contention, where the dedicated preamble for the public resource contention is selected from the RACH resources;

The second receiving unit, is specifically configured to receive an extended access response (RAR) sent by the base station, where the extended RAR carries the index number of the available public resource.

The second receiving unit, is further configured to, after the first sending unit sends to the base station the access information carrying the dedicated preamble for the public resource contention, if there is no available public resource, receive indication information sent by the base station, where the indication information is used to indicate the target user equipment to perform an operation of backoff.

The device further includes:

a backoff unit, configured to perform the backoff according to backoff parameters (BackOff parameters) after the second receiving unit receives the indication information sent by the base station.

A releasing unit, configured to, after the transmitting unit performs the data transmission through the available public resource corresponding to the index number of the available public resource, release the available public resource.

The releasing unit, is specifically configured to, when a cache status report is 0, release the available public resource; or when a maximum resource occupancy time exceeds a maximum occupancy time indicated in the public resource configuration, release the available public resource; or release the available public resource according to an indication of the base station.

The device further includes:

a third receiving unit, configured to, after the first receiving unit receives the public resource configuration sent by the base station through the broadcast channel, when the base station needs to transmit downlink data and the available public resource exists, receive the index number of the available public resource and a physical downlink control channel order (PDCCH order) sent by the base station;

the third receiving unit, is further configured to, if the PDCCH order carries a dedicated access resource, receive the downlink data through the available public resource according to a schedule of the base station, where the available public resource is obtained from the PHYConfig list according to the index number of the available public resource; or The device further includes:

a second sending unit, configured to, if the PDCCH order received by the third receiving unit does not carry the dedicated access resource, then after accessing successfully, send an identifier C-RNTI of the target user equipment to the base station;

a fourth receiving unit, configured to, after the second sending unit sends the identifier C-RNTI of the target user equipment to the base station, receive the downlink data through the available public resource according to an indication of the base station.

Another aspect provides a base station, including:

a processor, configured to broadcast public resource configuration to a user equipment on a broadcast channel, where the public resource configuration includes a physical resource configuration list (PHYConfig list);

a receiver, configured to, after the processor broadcasts the public resource configuration to the user equipments on the broadcast channel, receive public resource requesting information sent by a target user equipment which is in a desynchronization state;

the processor, is further configured to, after the receiver receives the public resource requesting information sent by the target user equipment, obtain available public resource;

a transmitter, configured to send to the target user equipment an index number of the available public resource obtained by the processor, so that the target user equipment performs data transmission through the available public resource corresponding to the index number of the available public resource, where the available public resource is obtained by the target user equipment, according to the index number of the available public resource, from the PHYConfig list broadcasted by the processor.

The processor, is further configured to, before the receiver receives the public resource requesting information sent by the target user equipment, trigger the target user equipment to enter into the desynchronization state through medium access control (MAC) layer control information or a radio resource control protocol (RRC) message.

The receiver, is specifically configured to, if the target user equipment accesses through an ordinary preamble (preamble) and accesses successfully, receive a MSG3 message which carries a public resource request and is sent by the target user equipment.

The public resource configuration further includes access resources (RACH resources), The receiver, is further specifically configured to, if the target user equipment accesses through a dedicated preamble for public resource contention, receive access information which carries the dedicated preamble for the public resource contention and is sent by the target user equipment, where the dedicated preamble for the public resource contention is selected from the RACH resources by the target user equipment;

The transmitter, is specifically configured to send an extended access response (RAR) to the target user equipment, where the extended RAR carries the index number of the available public resource.

The processor, is further configured to, before obtaining the available public resource, if there is no available public resource, indicate the target user equipment to perform backoff according to backoff parameters (BackOff parameters).

The processor, is further configured to, after the transmitter sends the index number of the available public resource to the target user equipment, release the available public resource.

The processor, is specifically configured to, when a buffer status report carried by the target user equipment is 0, release the available public resource; or when a maximum resource occupancy time exceeds a maximum occupancy time indicated in the public resource configuration, release the available public resource; or indicate the target user equipment via a signaling to release the available public resource.

The transmitter, is further configured to, after the processor broadcasts the public resource configuration to the user equipments on the broadcast channel, if downlink data need to be transmitted to the target user equipment and the available public resource exists, send the index number of the available public resource to the target user equipment and send a physical downlink control channel order (PDCCH order) to the target user equipment;

the processor, is further configured to, after the transmitter sends the index number of the available public resource to the target user equipment and sends the physical downlink control channel order (PDCCH order) to the target user equipment, if the PDCCH order carries a dedicated access resource configured for the target user equipment, then after the target user equipment accesses successfully through the dedicated access resource, schedule the target user equipment to receive the downlink data through the available public resource, where the available public resource is obtained by the target user equipment from the PHYConfig list according to the index number of the available public resource; or the receiver, is further configured to, after the transmitter sends the index number of the available public resource to the target user equipment and sends the physical downlink control channel order (PDCCH order) to the target user equipment, if the PDCCH order does not carry the dedicated access resource configured for the target user equipment, then after the target user equipment accesses successfully, receive an identifier C-RNTI of the target user equipment which is sent by the target user equipment;

the processor, is further configured to, after scrambling a physical downlink control channel with the C-RNTI received by the receiver, indicate the user equipment, via the scrambled physical downlink control channel, to receive the downlink data through the available public resource.

Another aspect provides a user equipment, including:

a receiver, configured to receive public resource configuration sent by a base station through a broadcast channel, where the public resource configuration includes a physical resource configuration list (PHYConfig list);

a transmitter, configured to, after the receiver receives the public resource configuration sent by the base station through the broadcast channel, send public resource requesting information to the base station, so that the base station obtains an available public resource;

the receiver, is further configured to receive an index number of the available public resource sent by the base station;

a processor, configured to perform data transmission through the available public resource corresponding to the index number of the available public resource received by the receiver, where the available public resource is obtained by the target user equipment from the PHYConfig list according to the index number of the available public resource.

The processor, is further configured to, before the transmitter sends the public resource requesting information to the base station, enter into the desynchronization state according to medium access control (MAC) layer control information or a radio resource control protocol (RRC) message.

The transmitter, is specifically configured to, if accessing through an ordinary preamble (preamble) and accessing successfully, send to the base station a MSG3 message carrying a public resource request.

The public resource configuration further includes access resources (RACH resources), The transmitter, is further specifically configured to, if accessing through a dedicated preamble for the public resource contention, send to the base station access information carrying the dedicated preamble for the public resource contention, where the dedicated preamble for the public resource contention is selected from the RACH resources;

The receiver, is specifically configured to receive an extended access response (RAR) sent by the base station, where the extended RAR carries the index number of the available public resource.

The receiver, is further configured to, after the transmitter sends to the base station the access information carrying the dedicated preamble for the public resource contention, if there is no available public resource, receive indication information sent by the base station, where the indication information is used to indicate the target user equipment to perform an operation of backoff;

The processor, is further configured to perform the backoff according to backoff parameters (BackOff parameters) after the receiver receives the indication information sent by the base station.

The processor, is further configured to, after performing the data transmission through the available public resource corresponding to the index number of the available public resource, release the available public resource.

The processor, is specifically configured to, when a buffer status report is 0, release the available public resource; or when a maximum resource occupancy time exceeds a maximum occupancy time indicated in the public resource configuration, release the available public resource; or release the available public resource according to an indication of the base station.

The receiver, is further configured to, after receiving the public resource configuration sent by the base station through the broadcast channel, when the base station needs to transmit downlink data and the available public resource exists, receive the index number of the available public resource and a physical downlink control channel order (PDCCH order) sent by the base station;

the receiver, is further configured to, if the PDCCH order carries a dedicated access resource, receive the downlink data through the available public resource according to a schedule of the base station, where the available public resource is obtained from the PHYConfig list according to the index number of the available public resource; or the transmitter, is further configured to, if the PDCCH order received by the receiver does not carry the dedicated access resource, then after accessing successfully, send an identifier C-RNTI of the target user equipment to the base station;

the receiver, is further configured to, after the transmitter sends the identifier C-RNTI of the target user equipment to the base station, receive the downlink data through the available public resource according to an indication of the base station.

In the method and the device for resource configuration according to embodiments of the present invention, at first a base station broadcasts public resource configuration to a user equipment on a broadcast channel, and then the base station obtains an available public resource after receiving public resource requesting information sent by a target user equipment which is in a desynchronization state, the target user equipment is a user equipment of the user equipments which is in a desynchronization state; finally the base station sends an index number of the available public resource to the target user equipment, so that the target user equipment performs data transmission through the available public resource corresponding to the index number of the available public resource. The way of the user equipment being permanent online is adopted in the prior art, when data arrive at the user equipment once again, the base station still needs to send a reconfiguration message to the user equipment, thereby resulting in the problem of high signaling overhead. However, in embodiments of the present invention, the base station broadcasts the public resource configuration in advance, when the data arrive at the user equipment, the base station simply needs to send the index number of the available public resource to the user equipment, and then the user equipment can obtain the available public resource corresponding to the index number of the available public resource from the public resource configuration broadcasted in advance, so as to complete the data transmission, thus the base station does not need to send the reconfiguration message to the user equipment to perform re-configuration, thereby reducing the signaling overhead.

BRIEF DESCRIPTION OF DRAWINGS

To describe technical solutions in embodiments of the present invention more clearly, the following briefly describes the accompanying drawings required in the description of embodiments or the prior art. Apparently, the accompanying drawings illustrate only some exemplary embodiments of the present invention, and those skilled in the art can derive other drawings from these drawings without creative efforts.

DESCRIPTION OF EMBODIMENTS

Technical solutions in embodiments of the present invention are described clearly and comprehensively with reference to the accompanying drawings. Obviously, the embodiments described are only a part rather than all of the embodiments of the present invention. All other embodiments derived by those skilled in the art on the basis of the embodiments herein without creative efforts fall within the protection scope of the present invention.

In order to make advantages of the technical solutions of the present invention more clear, the following describes the present invention in detail with reference to the accompanying drawings and embodiments.

Figure 1:
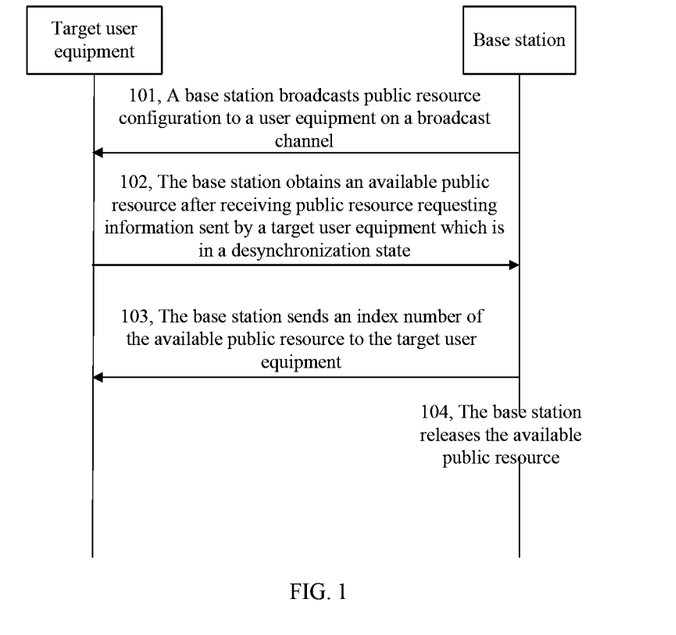
FIG. 1 is a flowchart of a method for resource configuration according to an embodiment of the present invention.

This embodiment provides a method for resource configuration, as shown in FIG. 1, the method includes:

101: A base station broadcasts public resource configuration to a user equipment on a broadcast channel.

Where the public resource configuration includes a physical resource configuration list (PHYConfig list), the PHYConfig list can specifically include: Index (available resource index number), CQI-ReportConfig (channel quality report configuration, CQI (channel quality indication, channel quality indication, configuration of a physical resource used for reporting channel quality)), soundingRS-UL-Config (uplink sounding reference signal configuration, soundingRS (SRS, sounding reference signal, configuration of a physical resource used for transmitting an uplink SRS)), scheduling Request Config (scheduling request configuration, configuration of a physical resource used for transmitting an uplink scheduling request).

102: The base station obtains an available public resource after receiving public resource requesting information sent by a target user equipment which is in a desynchronization state.

Specifically, if the target user equipment accesses through an ordinary preamble (preamble) and accesses successfully, the base station obtains an available public resource after receiving a MSG3 message which carries a public resource request (e.g. radio resource control protocol connection request, RRC connection request, message) and is sent by the target user equipment.

Alternatively, if the public resource configuration further includes access resources RACH resources, and the target user equipment accesses through a dedicated preamble for public resource contention, the base station obtains the available public resource after receiving access information which carries the dedicated preamble for the public resource contention and is sent by the target user equipment.

The dedicated preamble for public resource contention is selected from the RACH resources by the target user equipment, and the RACH resources can specifically include: RA-PRACH-MaskIndex (available physical random access channel resource index) and preambleInfo (available preamble resource).

Alternatively, if the public resource configuration further includes backoff parameters BackOff parameters, and there is no available public resource, the base station indicates the target user equipment to perform backoff according to the backoff parameters BackOff parameters.

Where, the BackOff parameters can specifically include: InitialBackOff (initial backoff parameter, used for backoff when accessing for the first time), FailureBackOff (failure backoff parameter, used for backoff when the access fails), NoResourceBackOff (no resource backoff parameter, used for backoff when the base station has no available public resource to allocate to the UE).

Optionally, before the step 102, the method can further include: the base station triggers the target user equipment to enter into the desynchronization state through medium access control MAC layer control information or through a radio resource control protocol RRC message.

103, The base station sends an index number of the available public resource to the target user equipment, so that the target user equipment performs data transmission through the available public resource corresponding to the index number of the available public resource.

Where, the available public resource is obtained from the PHYConfig list by the target user equipment according to the index number of the available public resource.

Specifically, when the public resource configuration further includes the access resources, RACH resources, the base station sends an extended access response RAR to the target user equipment, and the extended RAR carries the index number of the available public resource.

104, The base station releases the available public resource.

Specifically, when the base station determines that a buffer status report carried by the target user equipment is 0, the base station releases the available public resource.

Alternatively, when the base station determines that a maximum resource occupancy time exceeds a maximum occupancy time indicated in the public resource configuration, the base station releases the available public resource.

Alternatively, the base station indicates the target user equipment via a signaling to release the available public resources.

For embodiments of the present invention, when the base station needs to transmit downlink data to the target user equipment and the available public resource exists, the base station sends the index number of the available public resource to the target user equipment and sends a physical downlink control channel order (PDCCH order) to the target user equipment after broadcasting the public resource configuration to the user equipments on the broadcast channel; if the PDCCH order carries a dedicated access resource configured for the target user equipment, then after the target user equipment accesses successfully through the dedicated access resource, the base station schedules the target user equipment to receive the downlink data through the available public resource.

Where, the available public resource is obtained from the PHYConfig list by the target user equipment according to the index number of the available public resource.

Alternatively, if the PDCCH order does not carry the dedicated access resource configured for the target user equipment, then after the target user equipment accesses successfully, the base station receives an identifier C-RNTI of the target user equipment which is sent by the target user equipment; the base station scrambles the physical downlink control channel with the C-RNTI, and indicates the user equipment, via the scrambled physical downlink control channel, to receive the downlink data through the available public resource.

In the method for resource configuration according to the embodiments of the present invention, the base station broadcasts public resource configuration in advance, when data arrive at a user equipment, the base station only needs to send an index number of an available public resource to the user equipment, and then the user equipment can obtain the available public resource corresponding to the index number of the available public resource from the public resource configuration which is broadcasted in advance, so as to complete the data transmission, thus the base station does not need to send a reconfiguration message to the user equipment to perform re-configuration, thereby reducing the signaling overhead.

Figure 2:
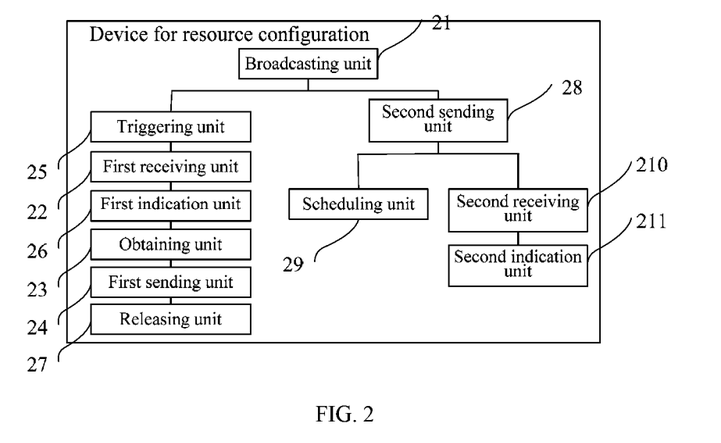
FIG. 2 is a schematic structural diagram of a device for resource configuration according to an embodiment of the present invention.

This embodiment provides a device for resource configuration, as shown in FIG. 2, the entity of the device can be a base station, the device includes: a broadcasting unit 21, a first receiving unit 22, an obtaining unit 23, a first sending unit 24, a triggering unit 25, a first indication unit 26, a releasing unit 27, a second sending unit 28, a scheduling unit 29, a second receiving unit 210, and a second indication unit 211.

The broadcasting unit 21 can be configured to broadcast public resource configuration to a user equipment on a broadcast channel.

Where, the public resource configuration can include access resources RACH resources, backoff parameters BackOff parameters, and physical resource configuration list PHYConfig list. The RACH resources include: RA-PRACH-MaskIndex (available physical random access channel resource index) and preambleInfo (available preamble resource), the BackOff parameters can specifically include: InitialBackOff (initial backoff parameter, used for backoff when accessing for the first time), FailureBackOff (failure backoff parameter, used for backoff when the access fails), NoResourceBackOff (no resource backoff parameter, used for backoff when the base station has no available public resource to allocate to the UE), the PHYConfig list can specifically include: Index (available resource index number), CQI-ReportConfig (channel quality report configuration, CQI (channel quality indication, channel quality indication, configuration of a physical resource used for reporting channel quality)), soundingRS-UL-Config (uplink sounding reference signal configuration, soundingRS (SRS, sounding reference signal, configuration of a physical resource used for transmitting an uplink SRS)), schedulingRequestConfig (scheduling request configuration, configuration of a physical resource used for transmitting an uplink scheduling request).

The first receiving unit 22, can be configured to, after the broadcasting unit 21 broadcasts the public resource configuration to the user equipments on the broadcast channel, receive public resource requesting information sent by a target user equipment which is in a desynchronization state.

The first receiving unit 22, can be specifically configured to, if the target user equipment accesses through an ordinary preamble (preamble) and accesses successfully, receive a message MSG3 which carries a public resource request and is sent by the target user equipment.

The first receiving unit, can be further specifically configured to, if the target user equipment accesses through a dedicated preamble for public resource contention, receive access information which carries the dedicated preamble for the public resource contention and is sent by the target user equipment.

Where, the dedicated preamble for the public resource contention is selected from the RACH resources by the target user equipment.

The obtaining unit 23, can be configured to obtain an available public resource after the first receiving unit 22 receives the public resource requesting information sent by the target user equipment.

The first sending unit 24, can be configured to send an index number of the available public resource obtained by the obtaining unit 23 to the target user equipment, so that the target user equipment performs data transmission through an available public resource corresponding to the index number of the available public resource.

The available public resource is obtained from the PHYConfig list by the target user equipment according to the index number of the available public resource, where the PHYConfig list is broadcasted by the broadcasting unit.

The first sending unit, can be specifically configured to send an extended access response RAR to the target user equipment, the extended RAR carries the index number of the available public resource.

The triggering unit 25, can be configured to, before the first receiving unit 22 receives the public resource requesting information sent by the target user equipment, trigger the target user equipment to enter into the desynchronization state through medium access control (MAC) layer control information or through a radio resource control protocol RRC message.

The first indication unit 26, is configured to, before the obtaining unit 23 obtains the available public resource and if there is no available public resource, indicate the target user equipment to perform backoff according to backoff parameters BackOff parameters.

The releasing unit 27, can be configured to release the available public resource after the first sending unit 24 sends the index number of the available public resource to the target user equipment.

The releasing unit 27, can be specifically configured to release the available public resource when a buffer status report carried by the target user equipment is 0.

The releasing unit 27, can be further specifically configured to release the available public resource when a maximum resource occupancy time exceeds a maximum occupancy time indicated in the public resource configuration.

The releasing unit 27, can be further specifically configured to indicate the target user equipment via a signaling to release the available public resource.

The second sending unit 28, can be configured to, after the broadcasting unit 21 broadcasts the public resource configuration to the user equipments on the broadcast channel and if downlink data need to be transmitted to the target user equipment and the available public resource exists, send the index number of the available public resource to the target user equipment and send a physical downlink control channel order PDCCH order to the target user equipment.

The scheduling unit 29, can be configured to, if the PDCCH order sent by the second sending unit 28 carries a dedicated access resource configured for the target user equipment, then after the target user equipment accesses successfully through the dedicated access resource, schedule the target user equipment to receive the downlink data through the available public resource, where the available public resource is obtained from the PHYConfig list by the target user equipment according to the index number of the available public resource.

The second receiving unit 210, can be configured to, if the PDCCH order sent by the second sending unit 28 does not carry the dedicated access resource configured for the target user equipment, then after the target user equipment accesses successfully, receive an identifier C-RNTI of the target user equipment which is sent by the target user equipment.

The second indication unit 211, can be configured to, after scrambling a physical downlink control channel with the C-RNTI received by the second receiving unit 210, indicate the user equipment, via the scrambled physical downlink control channel, to receive the downlink data through the available public resource.

In the device for resource configuration according to the embodiments of the present invention, the base station broadcasts public resource configuration in advance, when data arrive at a user equipment, the base station only needs to send an index number of an available public resource to the user equipment, and then the user equipment can obtain the available public resource corresponding to the index number of the available public resource from the public resource configuration which is broadcasted in advance, so as to complete the data transmission, thus the base station does not need to send a reconfiguration message to the user equipment to perform re-configuration, thereby reducing the signaling overhead.

Figure 3:
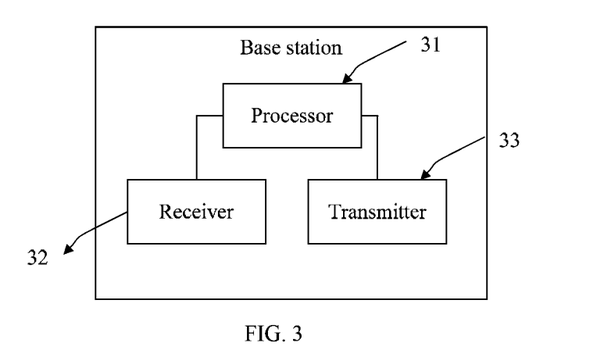
FIG. 3 is a schematic structural diagram of a base station according to an embodiment of the present invention.

This embodiment provides a base station, as shown in FIG. 3, the base station includes: a processor 31, a receiver 32, and a transmitter 33.

The processor 31, can be configured to broadcast public resource configuration to a user equipments on a broadcast channel.

The receiver 32, configured to receive public resource requesting information sent by a target user equipment which is in a desynchronization state, after the processor 31 broadcasts the public resource configuration to the user equipment.

The transmitter 33, can be configured to send an index number of an available public resource obtained by the processor 31 to the target user equipment, so that the target user equipment performs data transmission through the available public resource corresponding to the index number of the available public resource.

Where the available public resource is obtained from a PHYConfig list by the target user equipment according to the index number of the available public resources, the PHYConfig list is broadcasted by the processor.

The processor 31, can be further configured to obtain the available public resource after the receiver 32 receives the public resource requesting information sent by the target user equipment.

The processor 31, can be further configured to, before the receiver 32 receives the public resource requesting information sent by the target user equipment, trigger the target user equipment to enter into the desynchronization state through medium access control (MAC) layer control information or through a radio resource control protocol RRC message.

The processor 31, can be further configured to, before obtaining available public resource and if there is no available public resource, indicate the target user equipment to perform backoff according to backoff parameters BackOff parameters.

The processor 31, can be further configured to release the available public resource after the transmitter sends the index number of the available public resource to the target user equipment.

The processor 31, can be specifically configured to release the available public resource when a buffer status report carried by the target user equipment is 0; or release the available public resource when a maximum resource occupancy time exceeds a maximum occupancy time indicated in the public resource configuration; or indicate the target user equipment via a signaling to release the available public resource.

The processor 31, can be further configured to, if the PDCCH order sent by the transmitter 33 carries a dedicated access resource configured for the target user equipment, then after the target user equipment accesses successfully through the dedicated access resource, schedule the target user equipment to receive the downlink data through the available public resource.

Where, the available public resource is obtained from the PHYConfig list by the target user equipment according to the index number of the available public resource.

The processor 31, can be further configured to, after scrambling a physical downlink control channel with a C-RNTI received by the receiver 32, indicate the user equipment, via the scrambled physical downlink control channel, to receive the downlink data through the available public resource.

The receiver 32, can be specifically configured to, if the target user equipment accesses through an ordinary preamble (preamble) and accesses successfully, receive a MSG3 message which carries a public resource request and is sent by the target user equipment.

The receiver 32, can be further specifically configured to, if the target user equipment accesses through a dedicated preamble for public resource contention, receive access information which carries the dedicated preamble for the public resource contention and is sent by the target user equipment, the dedicated preamble for public resources contention is selected from the RACH resources by the target user equipment.

The receiver 32, can be further configured to, if the PDCCH order sent by the transmitter 33 does not carry the dedicated access resource configured for the target user equipment, then after the target user equipment accesses successfully, receive an identifier C-RNTI of the target user equipment which is sent by the target user equipment.

The transmitter 33, can be configured to send an index number of the available public resource obtained by the processor 31 to the target user equipment, so that the target user equipment performs data transmission through the available public resource corresponding to the index number of the available public resource.

Where, the available public resource is obtained from a PHYConfig list by the target user equipment according to the index number of the available public resource, the PHYConfig list is broadcasted by the processor.

The transmitter 33, can be specifically configured to send an extended access response RAR to the target user equipment, the extended RAR carries the index number of the available public resource.

The transmitter 33, can be further configured to, after the processor 31 broadcasts the public resource configuration to the user equipments and if downlink data need to be transmitted to the target user equipment and the available public resource exist, send the index number of the available public resource to the target user equipment and send a physical downlink control channel order PDCCH order to the target user equipment.

The base station according to the embodiments of the present invention, broadcasts public resource configuration in advance, when data arrive at the user equipment, only needs to send the index number of the available public resource to the user equipment, and then the user equipment can obtain the available public resource corresponding to the index number of the available public resource from the public resource configuration which is broadcasted in advance, so as to complete the data transmission, thus a reconfiguration message does not need to be sent to the user equipment to perform re-configuration, thereby reducing the signaling overhead.

Figure 4:
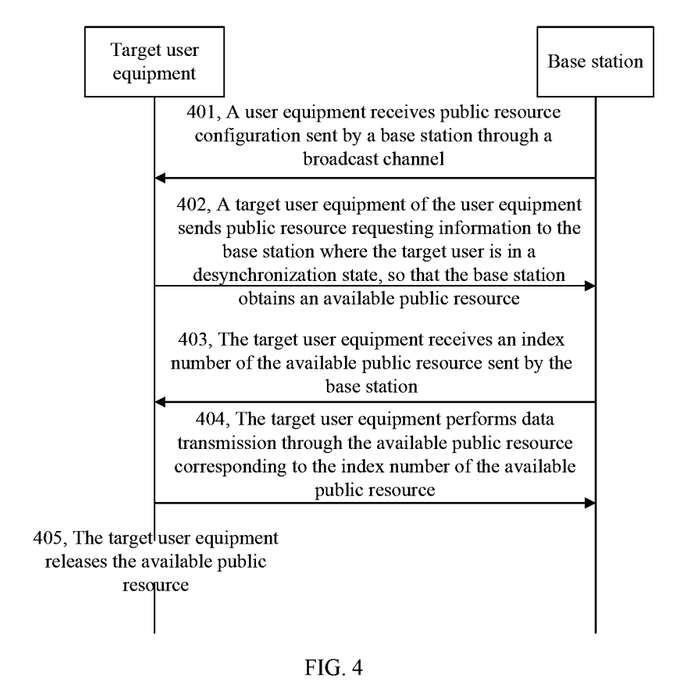
FIG. 4 is a flowchart of another method for resource configuration according to an embodiment of the present invention.

Embodiments of the present invention provide another method for resource configuration, as shown in FIG. 4, the method includes:

401, A user equipment receives public resource configuration sent by a base station through a broadcast channel.

Where the public resource configuration includes a physical resource configuration list PHYConfig list, the PHYConfig list can specifically include: Index (available resource index number), CQI-ReportConfig (channel quality report configuration, CQI (channel quality indication, channel quality indication, configuration of a physical resource used for reporting channel quality)), soundingRS-UL-Config (uplink sounding reference signal configuration, soundingRS (SRS, sounding reference signal, configuration of a physical resource used for transmitting an uplink SRS)), schedulingRequestConfig (scheduling request configuration, configuration of a physical resource used for transmitting an uplink scheduling request).

402, A target user equipment of the user equipment sends public resource requesting information to the base station, where the target user equipment is in a desynchronization state, so that the base station obtains an available public resource.

Specifically, if the target user equipment accesses through an ordinary preamble (preamble) and accesses successfully, the target user equipment sends a MSG3 message which carries a public resource request to the base station.

Alternatively, if the public resource configuration further includes access resources RACH resources, and the target user equipment accesses through a dedicated preamble for public resource contention, the target user equipment sends access information which carries the dedicated preamble for the public resource contention to the base station.

Where the dedicated preamble for the public resource contention is selected from the RACH resources by the target user equipment, the RACH resources can specifically include: RA-PRACH-MaskIndex (available physical random access channel resource index) and preambleInfo (available preamble resource).

Further, if the public resource configuration further includes backoff parameters BackOff parameters, and there is no available public resource, the indication information is used to indicate the target user equipment to perform an operation of backoff; and then the target user equipment performs the backoff according to the backoff parameters BackOff parameters.

Where, the BackOff parameters can specifically include: InitialBackOff (initial backoff parameter, used for backoff when accessing for the first time), FailureBackOff (failure backoff parameter, used for backoff when the access fails), NoResourceBackOff (no resource backoff parameter, used for backoff when the base station has no available public resource to allocate to the UE), the target user equipment receives the indication information sent by the base station, Optionally, before the step 402, the method can further include: the target user equipment enters into the desynchronization state according to medium access control (MAC) layer control information or a radio resource control protocol RRC message.

403, The target user equipment receives an index number of the available public resource sent by the base station.

Specifically, if the public resource configuration further includes access resources RACH resources, the target user equipment receives an extended access response RAR sent by the base station, the extended RAR carries the index number of the available public resource.

404, The target user equipment performs data transmission through an available public resource corresponding to the index number of the available public resource.

Where, the available public resource is obtained from the PHYConfig list by the target user equipment according to the index number of the available public resource.

405, the target user equipment releases the available public resource.

Specifically, when the target user equipment determines that a buffer status report is 0, the target user equipment releases the available public resource.

Alternatively, when a maximum resource occupancy time exceeds a maximum occupancy time indicated in the public resource configuration, the target user equipment releases the available public resource.

Alternatively, the target user equipment releases the available public resource according to the indication of the base station.

For this embodiment, if the base station needs to transmit downlink data to the target user equipment and the available public resource exists, after receiving the public resource configuration sent by the base station through the broadcast channel the target user equipment receives the index number of the available public resource and a physical downlink control channel order PDCCH order sent by the base station; if the PDCCH order carries a dedicated access resource configured for the target user equipment, the target user equipment receives the downlink data through the available public resource according to a schedule of the base station.

Where, the available public resource is obtained from the PHYConfig list by the target user equipment according to the index number of the available public resource.

Alternatively, if the PDCCH order does not carry the dedicated access resource configured for the target user equipment, then after the target user equipment accesses successfully, the target user equipment sends an identifier C-RNTI of the target user equipment to the base station; and then the target user equipment receives the downlink data through the available public resource according to the indication of the base station.

In the method for resource configuration according to the embodiments of the present invention, the user equipment receives the public resource configuration broadcasted by the base station in advance, when data arrive at the user equipment, an available public resource corresponding to the index number of the available public resource can be obtained from the public resource configuration broadcasted in advance simply according to the received index number of the available public resources, so as to complete the data transmission, thus there is no need to receive a reconfiguration message to perform re-configuration, thereby reducing the signaling overhead.

Figure 5:
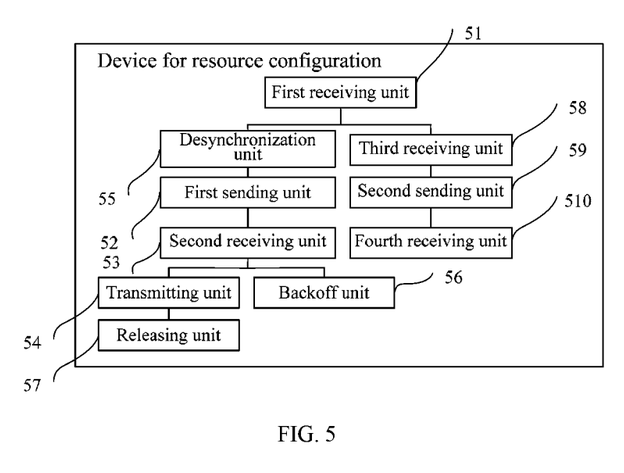
FIG. 5 is a schematic structural diagram of another device for resource configuration according to an embodiment of the present invention.

Embodiments of the present invention provide another device for resource configuration, as shown in FIG. 5, the entity of the device can be a user equipment, the device includes: a first receiving unit 51, a first sending unit 52, a second receiving unit 53, a transmitting unit 54, a desynchronization unit 55, a backoff unit 56, a releasing unit 57, a third receiving unit 58, a second sending unit 59, and a fourth receiving unit 510.

The first receiving unit 51, can be configured to receive public resource configuration sent by a base station through a broadcast channel, the public resource configuration includes a physical resource configuration list PHYConfig list.

The first sending unit 52, can be configured to send public resource requesting information to the base station after the first receiving unit 51 receives the public resource configuration sent by the base station through the broadcast channel, so that the base station obtains an available public resource.

The first sending unit 52, can be specifically configured to, if accessing through an ordinary preamble (preamble) and accessing successfully, send a MSG3 message which carries a public resource request to the base station.

The first sending unit 52, can be further specifically configured to, if accessing through a dedicated preamble for public resource contention, send access information which carries the dedicated preamble for the public resource contention to the base station, the dedicated preamble for the public resource contention is selected from the RACH resources.

The second receiving unit 53, can be configured to receive an index number of the available public resource sent by the base station.

The second receiving unit 53, can be specifically configured to receive an extended access response RAR sent by the base station, the extended RAR carries the index number of the available public resource.

The second receiving unit 53, can be further configured to, after the first sending unit 52 sends the access information which carries the dedicated preamble for the public resource contention to the base station, if there is no available public resource, receive indication information sent by the base station, the indication information is used to indicate the target user equipment to perform an operation of backoff.

The transmitting unit 54, can be configured to perform data transmission through the available public resource corresponding to the index number of the available public resource received by the second receiving unit.

Where the available public resource is obtained from the PHYConfig list by a target user equipment according to the index number of the available public resource.

The desynchronization unit 55, can be configured to, before the first sending unit 52 sends the public resource requesting information to the base station, enter into the desynchronization state according to medium access control (MAC) layer control information or a radio resource control protocol RRC message.

The backoff unit 56, can be configured to perform the backoff according to backoff parameters BackOff parameters after the second receiving unit 53 receives the indication information sent by the base station.

The releasing unit 57, can be configured to release the available public resource after the transmitting unit performs the data transmission through the available public resource corresponding to the index number of the available public resource.

The releasing unit 57, can be specifically configured to release the available public resource when a buffer status report is 0; or release the available public resource when a maximum resource occupancy time exceeds a maximum occupancy time indicated in the public resource configuration; or release the available public resource according to the indication of the base station.

The third receiving unit 58, can be configured to, after the first receiving unit 51 receives the public resource configuration sent by the base station through the broadcast channel, and when the base station needs to transmit downlink data and the available public resource exists, receive the index number of the available public resource and a physical downlink control channel order PDCCH order sent by the base station.

The third receiving unit 58, can be further configured to, if the PDCCH order carries a dedicated access resource, receive the downlink data through the available public resource according to a schedule of the base station.

Where, the available public resource is obtained from the PHYConfig list according to the index number of the available public resource.

The second sending unit 59, is configured to, if the PDCCH order received by the third receiving unit 58 does not carry the dedicated access resource, then after accessing successfully, send an identifier C-RNTI of the target user equipment to the base station.

The fourth receiving unit 510, can be configured to, after the second sending unit 59 sends the identifier C-RNTI of the target user equipment to the base station, receive the downlink data through the available public resource according to the indication of the base station.

In the device for resource configuration according to the embodiments of the present invention, through receiving the public resource configuration broadcasted by the base station in advance, when data arrive, the available public resource corresponding to the index number of the available public resource can be obtained from the public resource configuration broadcasted in advance simply according to the received index number of the available public resource, so as to complete the data transmission, thus there is no need to receive a reconfiguration message to perform re-configuration, thereby reducing the signaling overhead.

Figure 6:
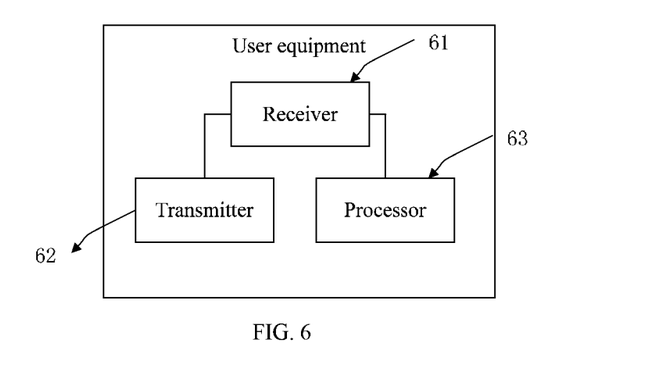
FIG. 6 is a schematic structural diagram of a user equipment according to an embodiment of the present invention.

Embodiments of the invention provide a user equipment, as shown in FIG. 6, the user equipment includes: a receiver 61, a transmitter 62, and a processor 63.

The receiver 61, can be configured to receive public resource configuration sent by a base station through a broadcast channel, the public resource configuration includes a physical resource configuration list PHYConfig list.

The receiver 61, can be further configured to receive an index number of the available public resource sent by the base station.

The transmitter 62, can be configured to, after the receiver 61 receives the public resource configuration sent by the base station through the broadcast channel, send public resource requesting information to the base station, so that the base station obtains the available public resource.

The processor 63, can be configured to perform data transmission through the available public resource corresponding to the index number of the available public resource received by the receiver 61, where the available public resource is obtained from the PHYConfig list by the target user equipment according to the index number of the available public resource.

The receiver 61, can be specifically configured to receive an extended access response RAR sent by the base station, the extended RAR carries the index number of the available public resource.

The receiver 61, can be further configured to, after the transmitter sends access information which carries the dedicated preamble for public resource contention to the base station, and if there is no available public resource, receive indication information sent by the base station, the indication information is used to indicate the target user equipment to perform an operation of backoff.

The receiver 61, can be further configured to, after receiving the public resource configuration sent by the base station through the broadcast channel, and when the base station needs to transmit downlink data and the available public resource exists, receive the index number of the available public resource and a physical downlink control channel order PDCCH order sent by the base station.

The receiver 61, can be further configured to, if the PDCCH order carries a dedicated access resource, receive the downlink data through the available public resource according to a schedule of the base station.

Where, the available public resource is obtained from the PHYConfig list according to the index number of the available public resource.

The receiver 61, can be further configured to receive the downlink data through the available public resource according to the indication of the base station after the transmitter 62 sends an identifier C-RNTI of the target user equipment to the base station.

The transmitter 62, can be specifically configured to, if accessing through an ordinary preamble (preamble) and accessing successfully, send a MSG3 message which carries a public resource request to the base station.

The transmitter 62, can be further configured to, if the PDCCH order received by the receiver does not carry the dedicated access resource, then after accessing successfully, send the identifier C-RNTI of the target user equipment to the base station.

The processor 63, can be further configured to, before the transmitter sends the public resource requesting information to the base station, enter into the desynchronization state according to medium access control (MAC) layer control information or a radio resource control protocol RRC message.

The processor 63, can be further configured to perform the backoff according to backoff parameters BackOff parameters after the receiver 61 receives the indication information sent by the base station.

The processor 63, can be further configured to release the available public resource after performing the data transmission through the available public resource corresponding to the index number of the available public resource.

The processor 63, can be specifically configured to release the available public resource when a buffer status report is 0; or release the available public resource when a maximum resource occupancy time exceeds a maximum occupancy time indicated in the public resource configuration; or release the available public resource according to an indication of the base station.

The device for resource configuration according to the embodiments of the present invention can implement the method embodiments provided above, please refer to the descriptions in the method embodiments for the specific function implementation, which will not be repeated here. The method and the device for resource configuration according to the embodiments of the present invention can be applied to the field of communication system, but not limited to this.

Those skilled in the art may understand that all or part of the steps in the methods of the embodiments of the present invention can be implemented by hardware under the indication of a program. The program may be stored in a computer readable storage medium and when the program is executed, processes of the method embodiments according to the present invention may be included. Where, the storage medium may be a magnetic disk, an optical disk, a read only memory (Read-Only Memory, ROM), or a random access memory (Random Access Memory, RAM), etc.

The above mentioned are only specific embodiments of the present invention, however the scope of the present invention is not limited to this, modifications or replacements can be easily thought of within the scope of the present invention by any technical person familiar with the art, all of which should fall within the scope of the present invention. Therefore, the scope of the present invention is defined by the scope of the claims.

What is claimed is:
1. A method for resource configuration, comprising:
broadcasting, by a base station, a public resource configuration to a user equipment on a broadcast channel, wherein the public resource configuration comprises a physical resource configuration list (PHYConfig list);

obtaining, by the base station, an available public resource after receiving public resource requesting information sent by a target user equipment which is in a desynchronization state;

sending, by the base station, an index number of the available public resource to the target user equipment, to enable the target user equipment to perform data transmission through the available public resource corresponding to the index number of the available public resource, wherein the available public resource is obtained by the target user equipment from the PHYConfig list according to the index number of the available public resource;

when the base station needs to transmit downlink data to the target user equipment and the available public resource exists, sending, by the base station the index number of the available public resource to the target user equipment and sending a physical downlink control channel order (PDCCH order) to the target user equipment;

if the PDCCH order carries a dedicated access resource configured for the target user equipment, then after the target user equipment accesses successfully through the dedicated access resource, scheduling, by the base station, the target user equipment to receive the downlink data through the available public resource, wherein the available public resource is obtained by the target user equipment from the PHYConfig list according to the index number of the available public resource; or if the PDCCH order does not carry the dedicated access resource configured for the target user equipment, then after the target user equipment accesses successfully, receiving, by the base station, an identifier C-RNTI of the target user equipment which is sent by the target user equipment; and scrambling, by the base station, a physical downlink control channel with the C-RNTI, and indicating the user equipment, via the scrambled physical downlink control channel, to receive the downlink data through the available public resource.

2. The method for resource configuration according to claim 1, wherein before receiving, by the base station, the public resource requesting information sent by the target user equipment which is in the desynchronization state, the method further comprises:

triggering, by the base station, the target user equipment to enter into the desynchronization state using medium access control (MAC) layer control information or a radio resource control protocol (RRC) message.

3. The method for resource configuration according to claim 1, wherein the obtaining, by the base station, the available public resource after receiving the public resource requesting information sent by the target user equipment comprises:

if the target user equipment accesses through an ordinary preamble (preamble) and accesses successfully, obtaining, by the base station, the available public resource after receiving a MSG3 message which carries a public resource request and is sent by the target user equipment.

4. The method for resource configuration according to claim 1, wherein the public resource configuration further comprises access resources (RACH resources), the obtaining, by the base station, the available public resource after receiving the public resource requesting information sent by the target user equipment which is in the desynchronization state comprises:

if the target user equipment accesses through a dedicated preamble for public resource contention, obtaining, by the base station, the available public resource after receiving access information which carries the dedicated preamble for the public resource contention and is sent by the target user equipment, wherein the dedicated preamble for the public resource contention is selected from the RACH resources by the target user equipment; and the sending, by the base station, the index number of the available public resource to the target user equipment comprises:

sending, by the base station, an extended access response (RAR) to the target user equipment, wherein the extended RAR carries the index number of the available public resource.

5. A method for resource configuration, comprising:

receiving, by a user equipment, a public resource configuration sent by a base station through a broadcast channel, wherein the public resource configuration comprises a physical resource configuration list (PHYConfig list);

sending, by a target user equipment of the user equipment, public resource requesting information to the base station, so that the base station obtains an available public resource, wherein the target user equipment is in a desynchronization state;

receiving, by the target user equipment, an index number of the available public resource sent by the base station;

performing, by the target user equipment, data transmission through the available public resource corresponding to the index number of the available public resource, wherein the available public resource is obtained by the target user equipment from the PHYConfig list according to the index number of the available public resource;

wherein after receiving, by the user equipment, the public resource configuration sent by the base station through the broadcast channel, the method further comprises:

when the base station needs to transmit downlink data to the target user equipment and an available public resource exists, receiving, by the target user equipment, an index number of the available public resource and a physical downlink control channel order (PDCCH order) sent by the base station;

if the PDCCH order carries a dedicated access resource configured for the target user equipment, receiving, by the target user equipment, the downlink data through the available public resource according to a schedule of the base station, wherein the available public resource is obtained by the target user equipment from the PHYConfig list according to the index number of the available public resource; or if the PDCCH order does not carry the dedicated access resource configured for the target user equipment then after the target user equipment accesses successfully sending by the target user equipment, an identifier C-RNTI of the target user equipment to the base station;

receiving, by the target user equipment, the downlink data through the available public resource according to an indication of the base station.

6. The method for resource configuration according to claim 5, wherein before sending, by the target user equipment of the user equipment the public resource requesting information to the base station, wherein the target user equipment is in the desynchronization state, the method further comprises:

entering, by the target user equipment, into the desynchronization state according to medium access control (MAC) layer control information or a radio resource control protocol (RRC) message.

7. The method for resource configuration according to claim 5, wherein the sending, by the target user equipment of the user equipment the public resource requesting information to the base station, where the target user equipment is in the desynchronization state, comprises:

if the target user equipment accesses through an ordinary preamble (preamble) and accesses successfully, sending, by the target user equipment to the base station, a MSG3 message carrying a public resource request.

8. The method for resource configuration according to claim 5, wherein the public resource configuration further comprises access resources (RACH resources), the sending, by the target user equipment of the user equipment, the public resource requesting information to the base station, wherein the target user equipment is in the desynchronization state, comprises:

if the target user equipment accesses through a dedicated preamble for public resource contention, sending, by the target user equipment to the base station, access information carrying the dedicated preamble for the public resource contention, wherein the dedicated preamble for the public resource contention is selected by the target user equipment from the RACH resources;

the receiving, by the target user equipment, the index number of the available public resource sent by the base station comprises:

receiving, by the target user equipment, an extended access response (RAR) sent by the base station, wherein the extended RAR carries the index number of the available public resource.

9. A base station, comprising:

a processor, configured to broadcast a public resource configuration to a user equipment on a broadcast channel, wherein the public resource configuration comprises a physical resource configuration list (PHYConfig list);

a receiver, configured to, after the processor broadcasts the public resource configuration to the user equipment on the broadcast channel, receive public resource requesting information sent by a target user equipment which is in a desynchronization state;

the processor, is further configured to, after the receiver receives the public resource requesting information sent by the target user equipment, obtain an available public resource; and a transmitter, configured to send to the target user equipment an index number of the available public resource obtained by the processor, to enable the target user equipment to perform data transmission through the available public resource corresponding to the index number of the available public resource, wherein the available public resource is obtained by the target user equipment according to the index number of the available public resource, from the PHYConfig list broadcasted by the processor;

wherein the transmitter is further configured to, after the processor broadcasts the public resource configuration to the user equipment on the broadcast channel, if downlink data needs to be transmitted to the target user equipment and the available public resources exists, send the index number of the available public resource to the target user equipment and send a physical downlink control channel order (PDCCH order) to the target user equipment;

the processor is further configured to, if the PDCCH order carries a dedicated access resource configured for the target user equipment, then after the target user equipment accesses successfully through the dedicated access resource, schedule the target user equipment to receive the downlink data through the available public resource, wherein the available public resource is obtained by the target user equipment from the PHYConfig list according to the index number of the available public resource; or the receiver is further configured to, if the PDCCH order does not carry the dedicated access resource configured for the target user equipment, then after the target user equipment accesses successfully, receive an identifier C-RNTI of the target user equipment which is sent by the target user equipment;

the processor is further configured to, after scrambling a physical downlink control channel with the C-RNTI received by the receiver, indicate the user equipment, via the scrambled physical downlink control channel, to receive the downlink data through the available public resource.

10. The base station according to claim 9, wherein:

the processor, is further configured to, before the receiver receives the public resource requesting information sent by the target user equipment, trigger the target user equipment to enter into the desynchronization state through medium access control (MAC) layer control information or a radio resource control protocol (RRC) message.

11. The base station according to claim 9, wherein:

the receiver, is further configured to, if the target user equipment accesses through an ordinary preamble (preamble) and accesses successfully, receive a MSG3 message which carries a public resource request and is sent by the target user equipment.

12. The base station according to claim 9, wherein the public resource configuration further comprises access resources (RACH resources), the receiver is further configured to, if the target user equipment accesses through a dedicated preamble for public resource contention, receive access information which carries the dedicated preamble for public resource contention and is sent by the target user equipment, wherein the dedicated preamble for the public resource contention is selected from the RACH resources by the target user equipment;

the transmitter is further configured to send an extended access response (RAR) to the target user equipment, wherein the extended RAR carries the index number of the available public resource.

13. A user equipment, comprising:

a receiver, configured to receive a public resource configuration sent by a base station through a broadcast channel, wherein the public resource configuration comprises a physical resource configuration list (PHYConfig list);

a transmitter, configured to, after the receiver receives the public resource configuration sent by the base station through the broadcast channel, send public resource requesting information to the base station, to enable the base station to obtain an available public resource;

the receiver is further configured to receive an index number of the available public resource sent by the base station;

a processor, configured to perform data transmission through the available public resource corresponding to the index number of the available public resource received by the receiver, wherein the available public resource is obtained by the target user equipment from the PHYConfig list according to the index number of the available public resource;

wherein the receiver is further configured to, after receiving the public resource configuration sent by the base station through the broadcast channel, when the base station needs to transmit downlink data and the available public resource exists, receive the index number of the available public resource and a physical downlink control channel order (PDCCH order) sent by the base station;

the receiver is further configured to, if the PDCCH order carries a dedicated access resource, receive the downlink data through the available public resource according to a schedule of the base station, wherein the available public resource is obtained from the PHYConfig list according to the index number of the available public resource; or the transmitter is further configured to, if the PDCCH order received by the receiver does not carry the dedicated access resource, then after accessing successfully, send an identifier C-RNTI of the target user equipment to the base station; and the receiver is further configured to, after the transmitter sends the identifier C-RNTI of the target user equipment to the base station, receive the downlink data through the available public resource according to an indication of the base station.

14. The user equipment according to claim 13, wherein:

the processor is further configured to, before the transmitter sends the public resource requesting information to the base station, enter into the desynchronization state according to medium access control (MAC) layer control information or a radio resource control protocol (RRC) message.

15. The user equipment according to claim 13, wherein:

the transmitter is configured to, if accessing through an ordinary preamble (preamble) and accessing successfully, send to the base station a MSG3 message carrying a public resource request.

16. The user equipment according to claim 13, wherein the public resource configuration further comprises access resources (RACH resources), the transmitter is further configured to, if accessing through a dedicated preamble for public resource contention, send to the base station access information carrying the dedicated preamble for the public resource contention, wherein the dedicated preamble for the public resource contention is selected from the RACH resources;

the receiver is further configured to receive an extended access response (RAR) sent by the base station, wherein the extended RAR carries the index number of the available public resource.

* * * * *